United States Patent
Bernard

(10) Patent No.: US 6,454,497 B1
(45) Date of Patent: Sep. 24, 2002

(54) INSTALLATION FOR CONVEYING OBJECTS BY AIR FLOW SUCH AS, IN PARTICULAR BOTTLES AND/OR FLASKS

(75) Inventor: Frederic Bernard, Villeneuve D'Ascq (FR)

(73) Assignee: Rafale Technologie, Octeville sur Mer (FR)

(*) Notice: Subject to any disclaimer, the term of this patent is extended or adjusted under 35 U.S.C. 154(b) by 0 days.

(21) Appl. No.: 09/463,895
(22) PCT Filed: Jul. 30, 1998
(86) PCT No.: PCT/FR98/01703
§ 371 (c)(1), (2), (4) Date: Apr. 4, 2000
(87) PCT Pub. No.: WO99/07628
PCT Pub. Date: Feb. 18, 1999

(30) Foreign Application Priority Data

Aug. 5, 1997 (FR) .............................. 97 10236

(51) Int. Cl.[7] .................. B65G 53/16; B65G 53/26; B65G 53/38; B65G 69/06
(52) U.S. Cl. .......................... 406/86; 406/88; 198/493
(58) Field of Search .............................. 406/86, 88, 89, 406/90, 98; 198/493

(56) References Cited

U.S. PATENT DOCUMENTS

| | | | |
|---|---|---|---|
| 4,284,370 A | * 8/1981 | Danler et al. | 406/86 |
| 4,822,214 A | * 4/1989 | Aidlin et al. | 406/88 X |
| 5,100,265 A | * 3/1992 | Mirkin | 406/86 |
| 5,129,504 A | 7/1992 | Smith | |
| 5,161,919 A | * 11/1992 | Smith et al. | 406/86 |
| 5,246,314 A | * 9/1993 | Smith et al. | 406/86 |
| 5,299,889 A | 4/1994 | Langenbeck | |
| 5,501,552 A | 3/1996 | Simkowski | |

* cited by examiner

Primary Examiner—Christopher P Ellis
Assistant Examiner—Gene O. Crawford
(74) Attorney, Agent, or Firm—Harrison & Egbert

(57) ABSTRACT

An apparatus for conveying objects by air blowing including at least one transfer line along which the objects can be conveyed, a loader connected to the transfer line for loading the objects onto the line, and a blower cooperative with the line and the loader. The blower is capable of propelling the objects along the line with a stream of air. The blower includes a first blower cooperative with the loader and a second blower positioned along the transfer line and cooperative therewith. The first blower is suitable for propelling the objects from the loader onto the line. The first blower is detachably connected to the loader independent of the transfer line. The second blower is capable of propelling the objects along the line with a stream of air subsequent to the loader.

7 Claims, 2 Drawing Sheets

INSTALLATION FOR CONVEYING OBJECTS BY AIR FLOW SUCH AS, IN PARTICULAR BOTTLES AND/OR FLASKS

The present invention relates to an installation for conveying, by air blowing, objects such as, in particular, bottles and/or flasks.

However, although more especially designed for such applications, it can also be applied, for example, to any object having an end in the form of a neck.

At the present time, there are known installations for conveying bottles by air blowing comprising one or more transfer lines into which said bottles are introduced via a loading table.

The latter is equipped, for example, with a rail enabling the bottles to be guided to their transfer line, in which said bottles are propelled by a stream of air generated by a blowing caisson provided above their path.

To prevent the bottles from pushed by one another as they advance over said loading table, it is known to prolong the blowing caisson located at the start of the transfer line above the guide rail with which said table is equipped.

However, such a solution leads to difficulties in gaining access to the table, whereas the latter has to remain easy to reach to permit adjustments, in particular at the time of the numerous tests conducted when the installation is being started up, or in the event of a change in the shape of the bottles.

In addition, in the installations currently in use, in order to make it easier to set the bottles in motion, the pressure in the blowing caisson at the start of the transfer line is higher than the pressure over the rest of the transfer line, this being the case over a distance of several yards, whereas an over-pressure over a shorter distance would be sufficient. This is, then, a source of energy wastage and reduced line efficiency.

It should also be noted that most conveying installations are provided, at the start of the line, with an area for discharging the bottles so as to prevent any jams should an incident occur downstream on the transfer line.

At the present time, for the bottles to reach this discharge area, the pressure has to be maintained in the blowing chamber, at the very least at the start of the line.

However, this mode of operation can lead to numerous problems, particularly if maintaining pressure on the transfer line is incompatible with the type of incident that has occurred.

The object of the present invention is to provide an installation for conveying objects by air blowing that overcomes the aforementioned drawbacks and that can be more easily adjusted, particularly in the event of changing the format of the bottles to be transported.

Another object of the present invention is to provide an installation for conveying objects by air blowing that makes it easier to carry out testing.

A further object of the present invention is to provide an installation for conveying objects by air blowing the energy requirements of which are reduced and the efficiency of which is improved.

Another object of the present invention is to provide an installation for conveying objects by air blowing the operation of which is made more reliable.

Further objects and advantages of the present invention will emerge in the course of the description that follows, which is given solely by way of illustration and is not intended to limit same.

The invention relates to an installation for conveying, by air blowing, objects such as, in particular, bottles and/or flasks, having at least one line for transferring said objects, means for loading said line, and blowing means, making it possible to project a stream of air capable of propelling said objects, constituted at least by first blowing means, provided at least partially in the area of said loading means, characterised by the fact that said first blowing means are removable in relation to said loading means, independently of said transfer line.

The invention will be more readily understood from a study of the following description, accompanied by the annexed drawings, which form an integral part thereof, and wherein.

The present invention relates to an installation for conveying, by air blowing, objects such as, in particular, bottles and/or flasks.

However, although more especially intended for such applications, it can also be used, for example, for any object having an end in the form of a neck.

Figure 1:
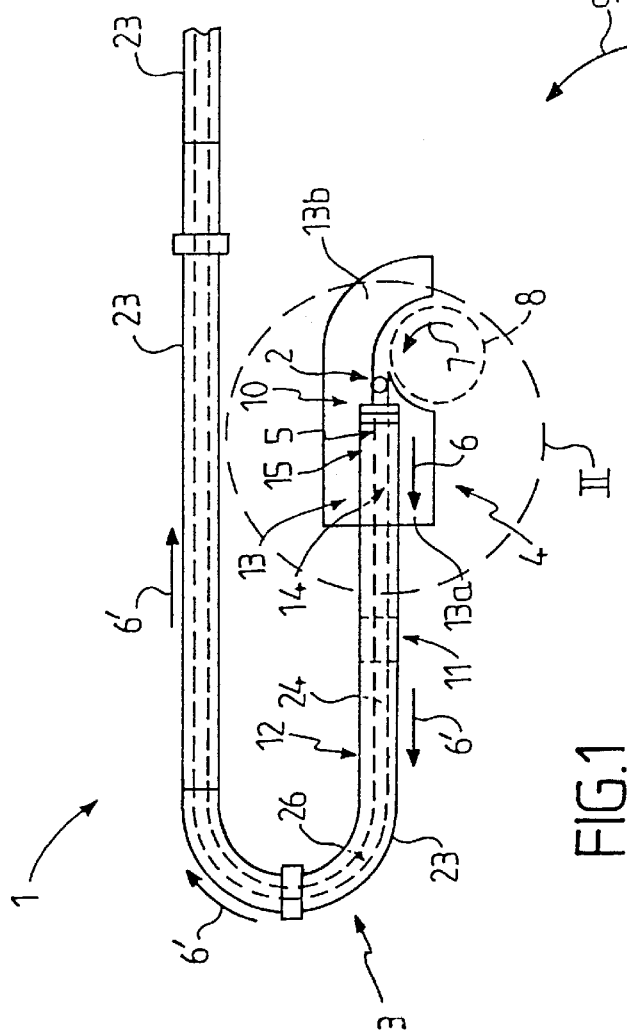
FIG. 1 is a top view illustration of an exemplary embodiment of a conveying installation according to the invention.

As shown in FIG. 1, the installation 1 for conveying objects 2 by air blowing, according to the invention, has at least one line 3 for transferring said objects 2 and means 4 for loading said transfer line 3.

In order to permit the setting in motion and/or the transport of said objects 2, said loading means 4 at least are equipped, at least partially, with blowing means, enabling a stream of air capable of propelling said objects 2 to be projected.

They are constituted by first blowing means, 5, provided, at least partially, in the area of said loading means 4 and, as applicable, by second loading means, 12, provided, at least partially, over the rest of transfer line 3.

According to the exemplary embodiment illustrated, said objects 2 are thus, in the area of said loading means 4, simultaneously aligned and set in motion, in the direction indicated by arrow 6, towards transfer line 3, in which they are started on their way. They are then transported, in the direction of arrows 6', towards their final destination, not shown. Loading means 4 are supplied, in particular, in the direction of arrow 7, by means of a turnstile 8, schematically represented in dashed lines.

This being the case, according to the invention, said first blowing means 5 are removable in relation to said loading means 4, independently of said transfer line 4.

Figure 2:
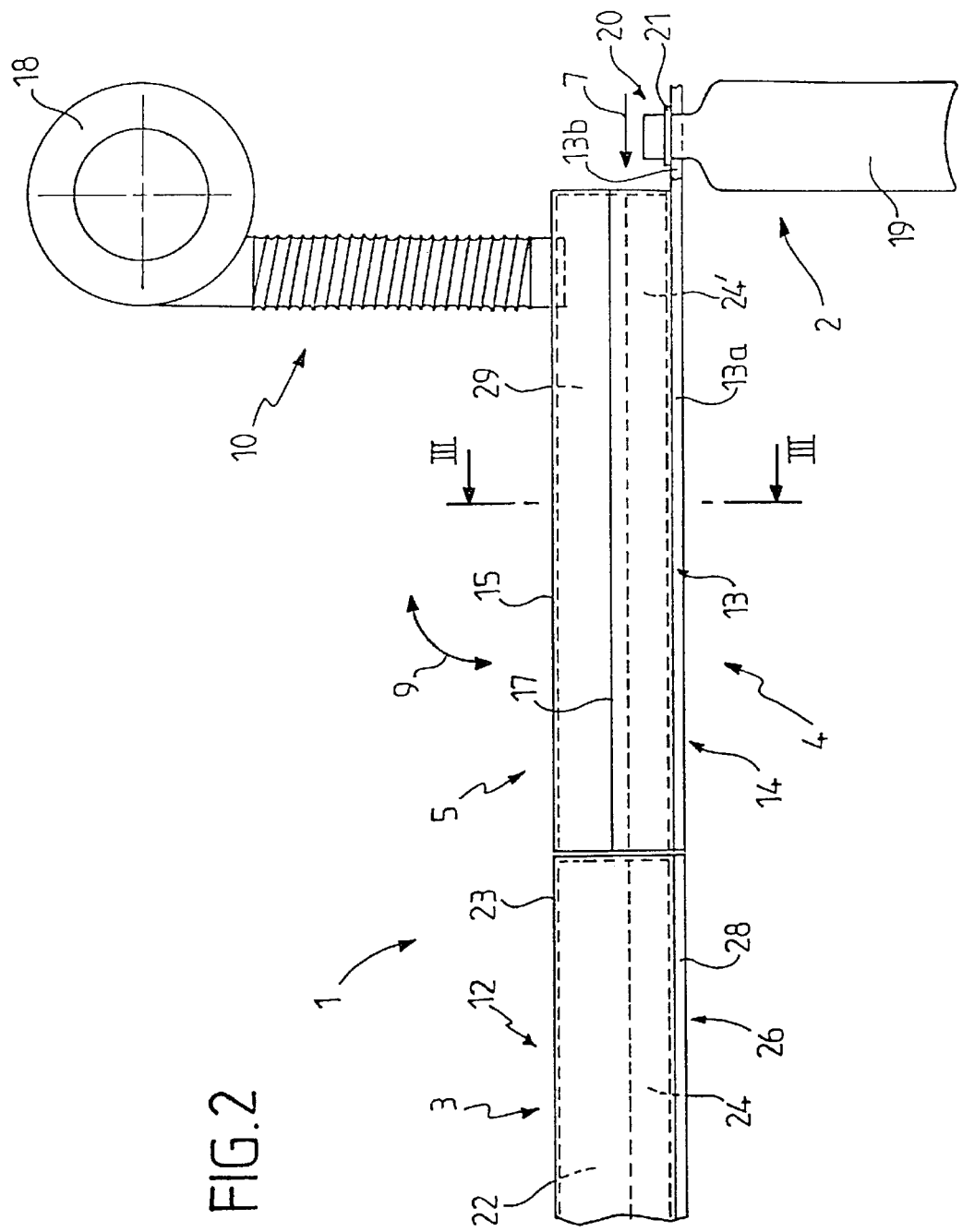
FIG. 2 is a partial side view detail of a portion identified by 11 in above FIG. 1.

Thus, as shown in FIG. 2, said first blowing means 5 can be put into place and/or removed from said loading means 4 at will, in the direction of arrow 9, without it being necessary to perform work on transfer line 3. Access to said loading means 4 is thus improved, which facilitates the adjustment and/or maintenance operations to be carried out thereon, particularly in the event of a change in the formats of objects 2 to be conveyed.

According to the exemplary embodiment illustrated, said first blowing means 5 are equipped with an independent source 10 of pulsed air, capable of setting up a starting pressure in the area of said loading means 4. It is no longer necessary, therefore, to maintain such a pressure at the start of transfer line 3 as said objects 2 have already been started on their way in the area of said loading means 4, thanks to said source 10 of pulsed air.

Any pressure at the start of transfer line 3 can thus be substantially identical with that provided subsequently, its sole purpose being to maintain movement, thus permitting energy savings.

In addition, it should be noted that the presence of such a source 10 of pulsed air will make it possible to commence testing without necessitating the presence of a transfer line 3 downstream to serve as an air generator.

The pressure in said first blowing means 5 can, furthermore, be designed, as applicable, to be sufficient to propel said objects 2 to a discharge area 11, provided at the start of transfer line 3, without the help of the blowing means, if any, of said transfer line 3, the so-called second blowing means 12.

Figure 3:
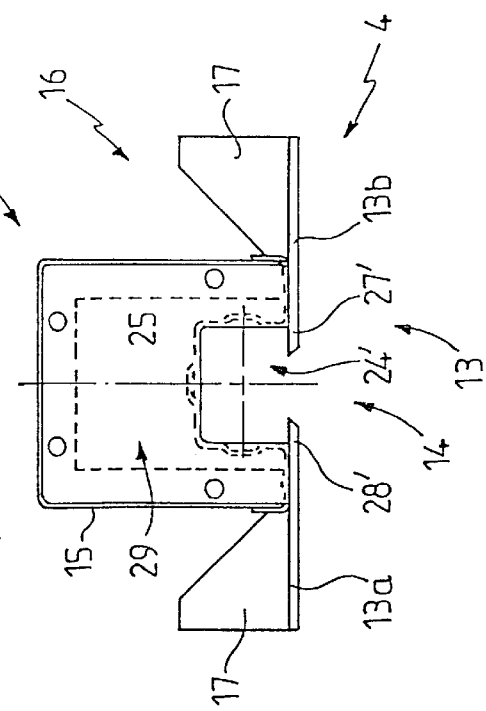
FIG. 3 is a cross-sectional view, along line III—III of above FIG. 2.

With reference, now, to FIG. 3, it will be noted that said loadingmeans 4 are constituted, for example, by at least one table, 13, having a first support rail, 14, capable of guiding said objects 2 to transfer line 3.

Said table 13 is constituted, for example, by two half-tables, 13a, 13b, provided facing one another, with said rail 14 located between the two.

Said first blowing means 5 are constituted, in particular, by a caisson, 15, which is removable in relation to said table 13.

Said table 13 is provided, as applicable, with means, 16, for centring said removable caisson 15 on said first support rail 14. These consist, for example, of wedge means 17, between which said removable caisson 15 is placed on said table 13.

As can be seen from FIG. 1, said removable caisson 15 can, as applicable, be designed to be of substantially the same length as said first support rail 14 or to be of a length that is slightly shorter so as to enable objects 2 to be propelled as soon as possible after they have been introduced onto table 13.

As to said source 10 of pulsed air, this is constituted, for example, by a fan, 18, connected to said removable caisson 15.

This being the case, according to the exemplary embodiment of invention that is illustrated, conveyed objects 2 are constituted, in particular, by a body, 19, terminating in an end, 20, in the form, for example, of a neck provided, directly or indirectly, with a protuberance, 21. The stream of air enabling said objects 2 to be propelled is projected, in particular, in the area of their said ends 20, the objects being guided, for example, with the help of said protuberance 21.

Said transfer line 3 is constituted, in particular, at least by a chamber, 22, defining said second blowing means 12. Said chamber 22 is formed, for example, by a plurality of fixed caissons, 23, secured end to end, said removable caisson 15 and said fixed caissons 23 being provided in the prolongation of one another.

Said fixed, 23, or removable, 15, caissons have, as applicable, a substantially identical quadrangular profile and are provided with a channel, 24, 24' on their lower face in which end 20 of said objects 2 can travel, the walls of said channel 24, 24' being provided with slits, 25, enabling said stream of air to be projected onto said ends 20.

Said transfer line 3 further includes, for example, a support rail, 26, or so-called second support rail, capable of guiding said objects 2 along their path and secured to said fixed caissons 23.

Said first support rail 14 and said second support rail 26 are located, in particular, in the prolongation of one another and have, as applicable, identical profiles.

In the area of fixed caissons 23, said support rail 26 is constituted, for example, by two guides, 28, provided underneath said blowing chamber 22 on either side of said channel 24 so as to be able to co-operate with protuberance 21 of said objects 2 in order to guide them.

In the area of removable caisson 15, said support rail 14 is also constituted, for example, by two guides, 27', 28', defined, in particular, by the facing edges of said half-tables 13a, 13b. Said guides 27', 28' are provided underneath said removable caisson 15 on either side of said channel 24 for the same purposes as guides 28 of support rail 26 of said fixed caissons 23, said removable caisson 15 itself also having a blowing cavity, 29.

Additional means for guiding said objects 2 can also be provided, means such as, for example, railings, not shown, mounted on rods provided beneath said table 13 and/or secured to said fixed caisson 23, said railings being designed to co-operate with bodies 19 of said objects 2 along their path.

Other forms of embodiment, within the grasp of a man of the art, could, of course, have been contemplated without thereby departing from the scope of the invention.

What is claimed is:

1. An apparatus for conveying objects by air blowing comprising:
    at least one line along which the objects can be conveyed;
    a loading means connected to the line for loading the objects onto the line, said loading means comprising a table having a first support rail for guiding the objects to the line;
    a blowing means cooperative with the line and said loading means, said blowing means for propelling the objects along said loading means and along the line with a stream of air, said blowing means comprising:
        a first blowing means cooperative with said loading means, said first blowing means for propelling the objects along said loading means onto the line, said first blowing means being detachably connected to said loading means and independent of the line, said first blowing means comprising a caisson removably connected to said table; and
        a second blowing means positioned along the line and cooperative therewith, said second blowing means for propelling the objects along the line with a stream of air, said second blowing means comprising a chamber formed by a plurality of fixed caissons secured together in end-to-end relationship, said plurality of fixed caissons and said caisson of said first blowing means being in communication with each other; and
    a transfer line comprising a second support rail extending from said first support rail, said first and second rails suitable for guiding the objects along a path, said second support rail being secured to said plurality of fixed caissons.

2. The apparatus of claim 1, said first blowing means for propelling the objects from said loading means onto the line without cooperation of said second blowing means.

3. The apparatus of claim 1, and caisson of said first blowing means having a length substantially equal to a length of said first support rail.

4. The apparatus of claim 1, said table having a centering means for centering said caisson of said first blowing means on said first support rail.

5. The apparatus of claim 1, said fixed caissons of said second blowing means and said caisson of said first blowing means defining a continuous chamber.

6. The apparatus of claim 1, said blowing means for providing a starting air pressure at said loading means such that an air pressure at a juncture of said loading means and the line is substantially equal to a pressure at a remote position along the line, said first blowing means comprising a source of pulsed air.

7. The apparatus of claim 6, said source of pulsed air comprising a fan connected to said caisson of said first blowing means.

* * * * *